(12) United States Patent
Gerawan et al.

(10) Patent No.: US 6,813,859 B1
(45) Date of Patent: Nov. 9, 2004

(54) TIE DOWN FOR PLASTIC GRAPE CANOPY

(75) Inventors: Michael Gerawan, Reedley, CA (US); Douglas Zweigle, Thermal, CA (US)

(73) Assignee: Gerawan Farming Partners, Inc., Sanger, CA (US)

( * ) Notice: Subject to any disclaimer, the term of this patent is extended or adjusted under 35 U.S.C. 154(b) by 3 days.

(21) Appl. No.: 10/437,779

(22) Filed: May 13, 2003

(51) Int. Cl.$^7$ .............................................. A01G 13/00
(52) U.S. Cl. ...................................................... 47/24.1
(58) Field of Search ........................... 359/483; 47/20.1, 47/24.1, 29.1, 29.5, 29.7, 31, 32.3; 52/3; 135/115, 119; 160/390

(56) References Cited

U.S. PATENT DOCUMENTS

| | | | | |
|---|---|---|---|---|
| 383,327 | A | * 5/1888 | Starr | 47/24.1 |
| 2,015,471 | A | * 9/1935 | Genuit | 47/23.1 |
| 3,162,920 | A | * 12/1964 | Durham | 24/265 R |
| 4,313,279 | A | * 2/1982 | Greenbaum | 47/29.1 |
| 5,956,923 | A | * 9/1999 | Andros et al. | 53/397 |
| 6,115,960 | A | * 9/2000 | Posa | 47/20.1 |
| 6,154,316 | A | * 11/2000 | Fukui et al. | 359/483 |
| 6,631,584 | B1 | * 10/2003 | Seinsevin | 47/44 |

FOREIGN PATENT DOCUMENTS

| | | | |
|---|---|---|---|
| DE | 2633366 A | * 1/1978 | A01G/13/02 |
| FR | 2689726 A3 | * 10/1993 | A01G/13/02 |
| FR | 2778061 A1 | * 11/1999 | A01G/13/02 |
| JP | 401095710 A | * 4/1989 | A01G/17/02 |

* cited by examiner

Primary Examiner—Michael J. Carone
Assistant Examiner—Francis T. Palo
(74) Attorney, Agent, or Firm—William Michael Hynes; Townsend and Townsend and Crew LLP

(57) ABSTRACT

A protective polyethylene canopy, in the order of 100 to 110 inches in width and approximately 1.3 mils thick, is placed over trellised grapevines and fastened by the disclosed tie downs at the respective canopy sides. To form the tie downs, the side edges of the canopy are gathered and folded back upon themselves at intervals up to 2 inches. Thereafter, tape, in the form of adhesive labels, is placed over the folded edges so as to capture the folded and gathered side film edges. The label and folded film is transpierced, typically by a worker using grape clippers holding attached twine. Once transpierced and threaded with the twine, the twine is tied to the label and the canopy material, and then secured at its remote end to tightly secure the canopy overlying the trellis and vines growing on the trellis.

11 Claims, 4 Drawing Sheets

TIE DOWN FOR PLASTIC GRAPE CANOPY

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

This invention relates to the growing of grapes under rain protective plastic canopies. More particularly an improved tie down is disclosed for rain protective plastic canopies.

BACKGROUND OF THE INVENTION

Grapes are typically grown in trellised dispositions. A typical trellis is either T-shaped or V-shaped and approximately 600 feet in length. While all grapes can be the subject matter of this invention, we are particularly concerned with problems of edible table grapes.

In the last six weeks before harvest, rain on table grapes is ruinous. It produces a mold on the grapes, which renders them unmarketable. The profits of a full growing season can be totally lost.

To avoid such a loss, it is known to cover the grapes with a plastic canopy. Typically, plastic material, either clear or opaque, is placed overlying the grapes. The canopy commences at the end of a trellis and continues uninterrupted to the other end of the trellis, typically covering both trellis ends. It is necessary to secure the canopy between the respective trellis ends. This securing between the trellis ends is done by discrete "tie downs." It is the function of the tie downs to fasten the canopy overlying the grapes between the respective sides of the trellis on which the grape vines grow.

A plastic material used to form the canopies is typically a polyethylene film. The film is thin having a thickness of between 0.9 and 1.3 milts. The plastic must be thick enough and strong enough to maintain the waterproof covering over the grapes growing beneath the plastic. At the same time, if the plastic is too thick, it becomes prohibitively expensive and interferes with the maturation of the grape crop that it is intended to protect. Therefore, the thickness of a polyethylene film utilized to cover the grape vines is severely constrained.

The tie downs of the prior art have included at least two discrete forms. In a first form of tie down, a hole is punched in the plastic of the canopy material. Twine is tightened about the hole at one end an secured to either a trellis wire or alternately part of the vines at the other end. Tightening of the canopy occurs to hopefully produce a smooth and tight contour over the vine covered trellis.

This first form of tie down frequently fails by tearing through to the edge of the plastic film forming the canopy. A portion of the canopy material is ripped away. At the same time, the remaining portion of the canopy is free to move with the elements (which can include wind and rain) up and away from the trellised vines the canopy was placed to protect.

In a second form of tie down, a wad of material is gathered to the canopy material near the edge. The canopy material is gathered around the wad, which wad is about the size of the golf ball. Once the canopy material is gathered about the golf ball size wad, twine is tied both about the canopy material and the wad so as to trap wad through the canopy material and form a tie down point in the canopy material.

This technique has its own disadvantages. First, it takes too long; speed is of the essence when placing canopies to protect grape vines from oncoming inclement weather. Second, the wad of material most commonly available comprises leaves of the grape vines. This material is irregularly selected with some damage to the vines, and can tear the canopy at the point of attachment. Third, stretching of the canopy material occurs in the vicinity of the wad. The stretching produces irregularities in the canopy material from which tearing can propagate.

Since the canopy material overlies the grape crop for periods of from four to six weeks, adjustment of the canopy film is frequently required. This adjustment requires putting additional strain on the tie downs. Simply stated, where the tie downs are adjusted after relatively long periods of installation in the vineyard, failure of the originally installed tie downs occurs with relatively high frequency.

BRIEF SUMMARY OF THE INVENTION

A protective polyethylene canopy, in the order of 100 to 110 inches in width and approximately 1.3 mils thick, is placed over trellised grapevines and fastened by the disclosed tie downs at the respective canopy sides. To form the tie downs, the side edges of the canopy are gathered and folded back upon themselves at intervals up to 2 inches. Thereafter, tape, in the form of adhesive labels, is placed over the folded edges so as to capture the folded and gathered side film edges. The label and folded film is transpierced, typically by a worker using grape clippers holding attached twine. Once transpierced and threaded with the twine, the twine is tied to the label and the canopy material, and then secured at its remote end to tightly secure the canopy overlying the trellis and vines growing on the trellis. The label is made from label face stock approximately 2½ inches in width and 6 inches in length consisting of the opaque white spun bound polyolefin film having high tear strength with good moisture resistance. The label has a rubber based adhesive placed on the label backside, this rubber adhesive having the ability to adhere to the protective polyethylene canopy. The labels are in turn sequentially fastened to a continuous spiral wound release tape consisting of bleached, supercalendered paper stock supplied with and anti-block coating on the backside of the liner to control adhesive and label transfer when the labels are removed from the release tape. The resultant tie downs have approximately four times the strength of those previously utilized, are moisture resistant, and are capable of withstanding the wide thermal excursions the protective grape canopy experience in the last four to six weeks of grape maturation before harvest. As a result, the protective canopy can be fastened overlying the trellised grapevines at relatively high tension to enable a firm weather resistance requiring minimal maintenance.

An advantage of the disclosed tie down is that its installation is swift. In modern commercial grape growing environments, the onset of inclement weather requires swift placement of protective canopies over trellised grapevines. By way of example, utilizing the disclosed tie downs, 9000 rows of trellised vines, each trellis being over 600 feet in length, have been covered with a protective canopy in an eighteen hour period!

A further advantage of the disclosed tie down is that it is four times as strong as tie downs previously used. This being the case, no longer is the point of attachment of the twine to the protective canopy the weak point of the canopy securing system; with the disclosed tie down it is more common to have breakage in the twine.

A further advantage of the disclosed tie down is that superior tension can be applied to the protective canopy being utilized. This enables the protective canopy to be optimally shaped, securely held in place, and maintained with minimal maintenance adjustments until grape harvesting occurs.

DETAILED DESCRIPTION OF THE INVENTION

Figure 1:
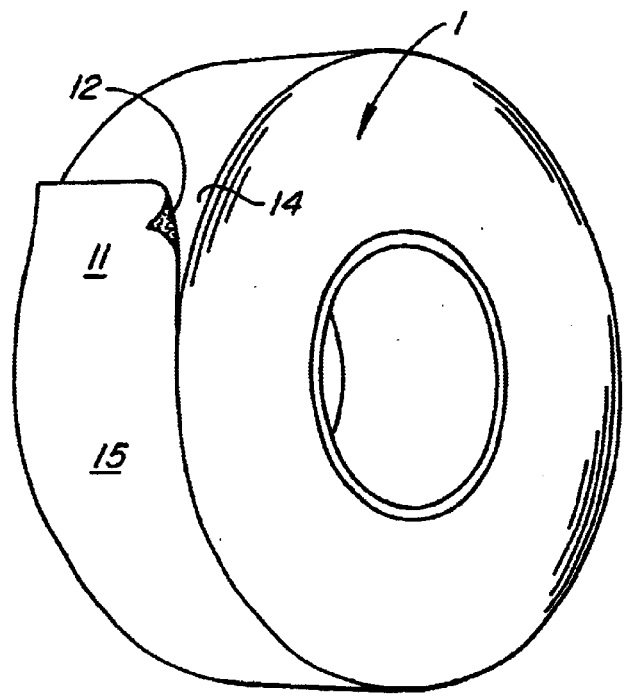
FIG. 1 is a perspective view of the label stock used for the improved tie downs of this invention illustrating the discrete labels temporarily adhered to the release tape spirally wound with a typical label in the process of being detached for the formation of a tie down.

Referring to FIG. 1, the tape used to reinforce the side edges of the film canopy is shown in the form of label roll 1. Label roll 1 includes label stock face 11. Stock face 11 is an opaque white spun bound polyolefin film with exceptional tear strength and moisture resistance. It is a typical labeling tape with high tear strength. It has a caliper of 010076 inches, a tensile strength (MD 43,000 PSI;CD 49,000 PSI), tear strength (MD 0.98 pounds; CD 0.93 pounds). Each label strip has a 2 ½ inch width and a 6 inch length. The label strip is cut between each label stock face 11 so as to enable the label strips to be conveniently removed in precut lengths during installation of the tie downs.

Label adhesive 12 is a rubber based adhesive with the ability to adhere to the polyethylene film utilized for the protective canopy. It features high initial tack and moderate ultimate adhesion. It is a solvent rubber with a minimum application temperature of 40 degrees Fahrenheit. It has a service range from 40 degrees Fahrenheit to 200 degrees Fahrenheit.

Label release strip 14 has a 54# per ream density. It has a caliper of 0.0032 inches with a tensile strength (MD 48# per inch width and CD 26# per inch width). It has tear strength of (MD 50 grams; CD 58 grams).

Label stock faces 11 have label adhesive 12 applied to the back surface thereof. Thereafter, the labels are sequentially applied to label release strip 14 and wound in the illustrated spiral pattern depicted in FIG. 1.

Figure 5:
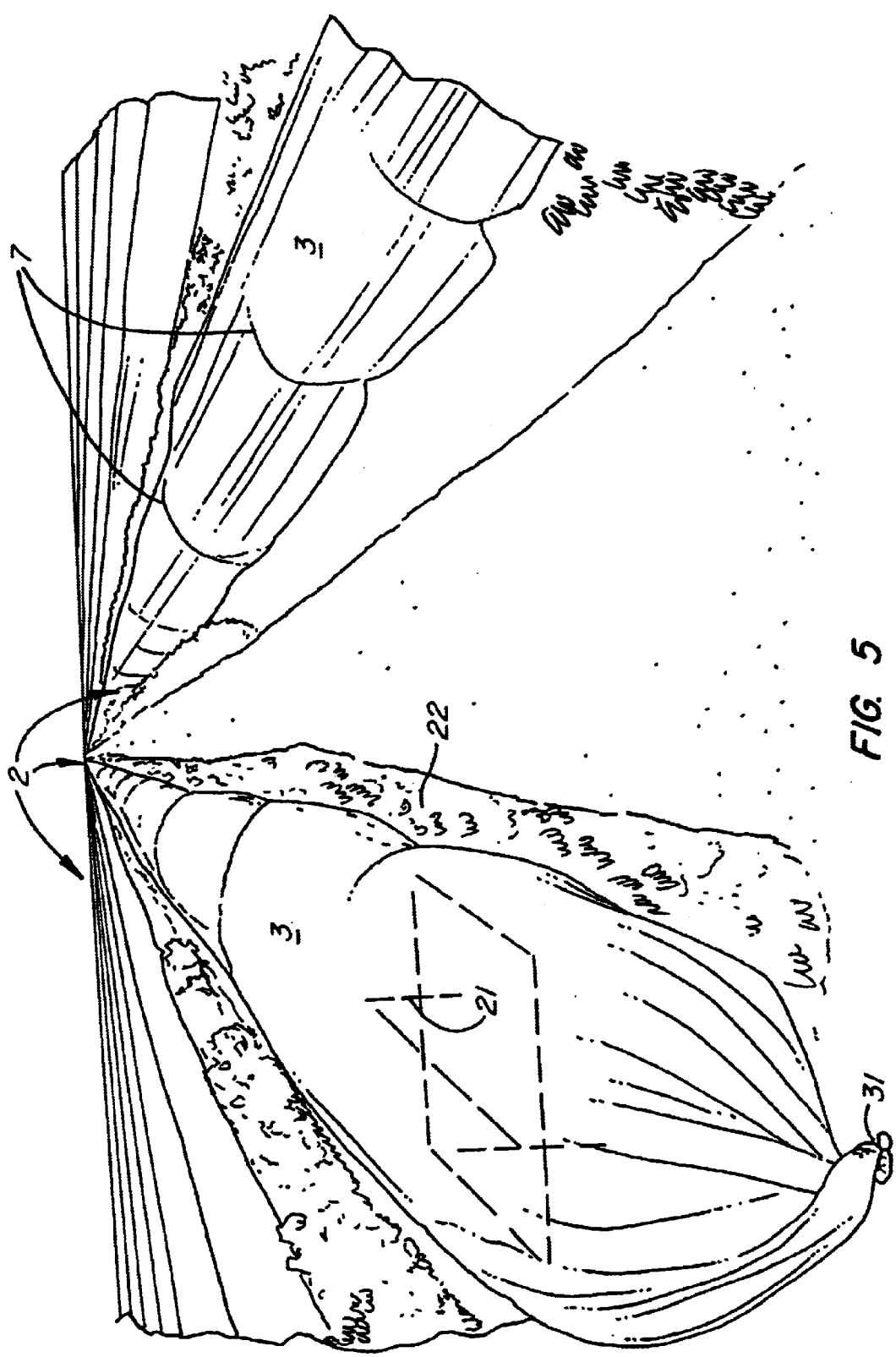

Having described label roll 1, attention can now be directed to trellised grapevines as they appear in FIG. 5.

Referring to FIG. 5, a T-shaped trellis 21 is shown covered with grapevines 22.

Overlying trellised grapevines 2, protective film canopy 3 can be seen. Protective film canopy 3 extends along each trellis row from first trellis end 31 to the opposite trellis end 31. Between the respective trellises in ends 31, the film canopy terminates at film canopy side edges 32. It is to these film canopy side edges 32 that the tie downs of this invention are applied.

Figure 2:
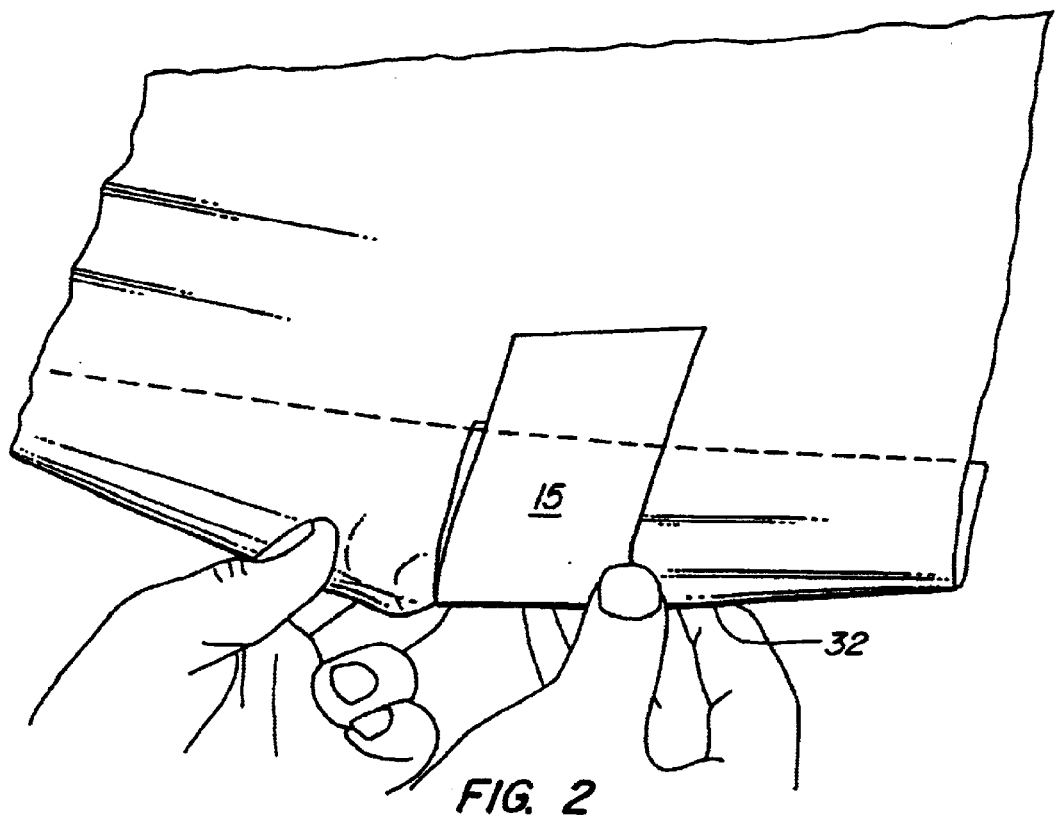
FIG. 2 is a perspective view of the protective polyethylene canopy being folded back at a side edge and cove red with the discrete label removed in FIG. 1.
Figure 3:
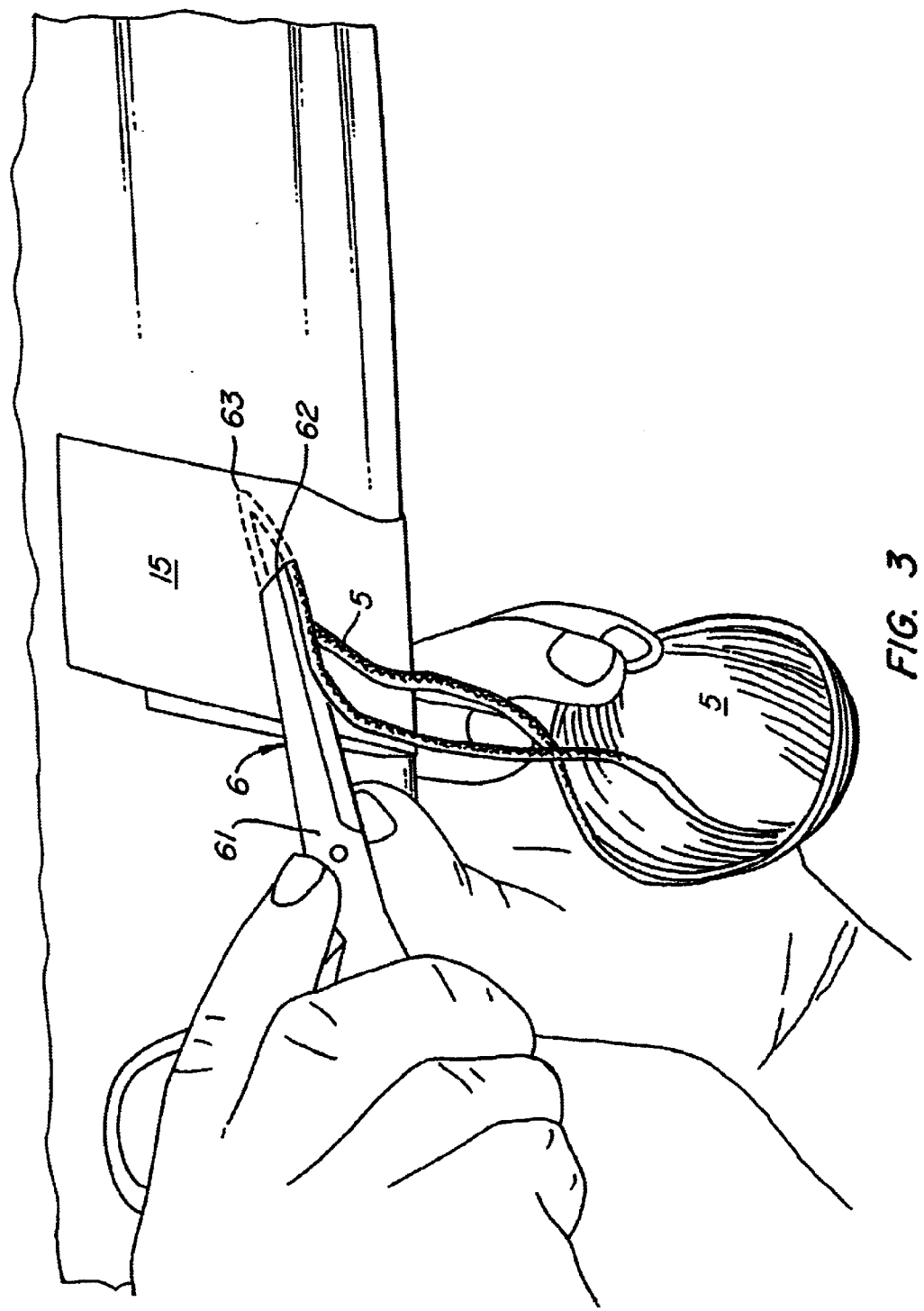
FIG. 3 is a perspective view at the side edge of the label canopy of FIG. 2 here illustrating transpiercing and threading of the label and canopy material with a grape clipper holding twine.
Figure 4:
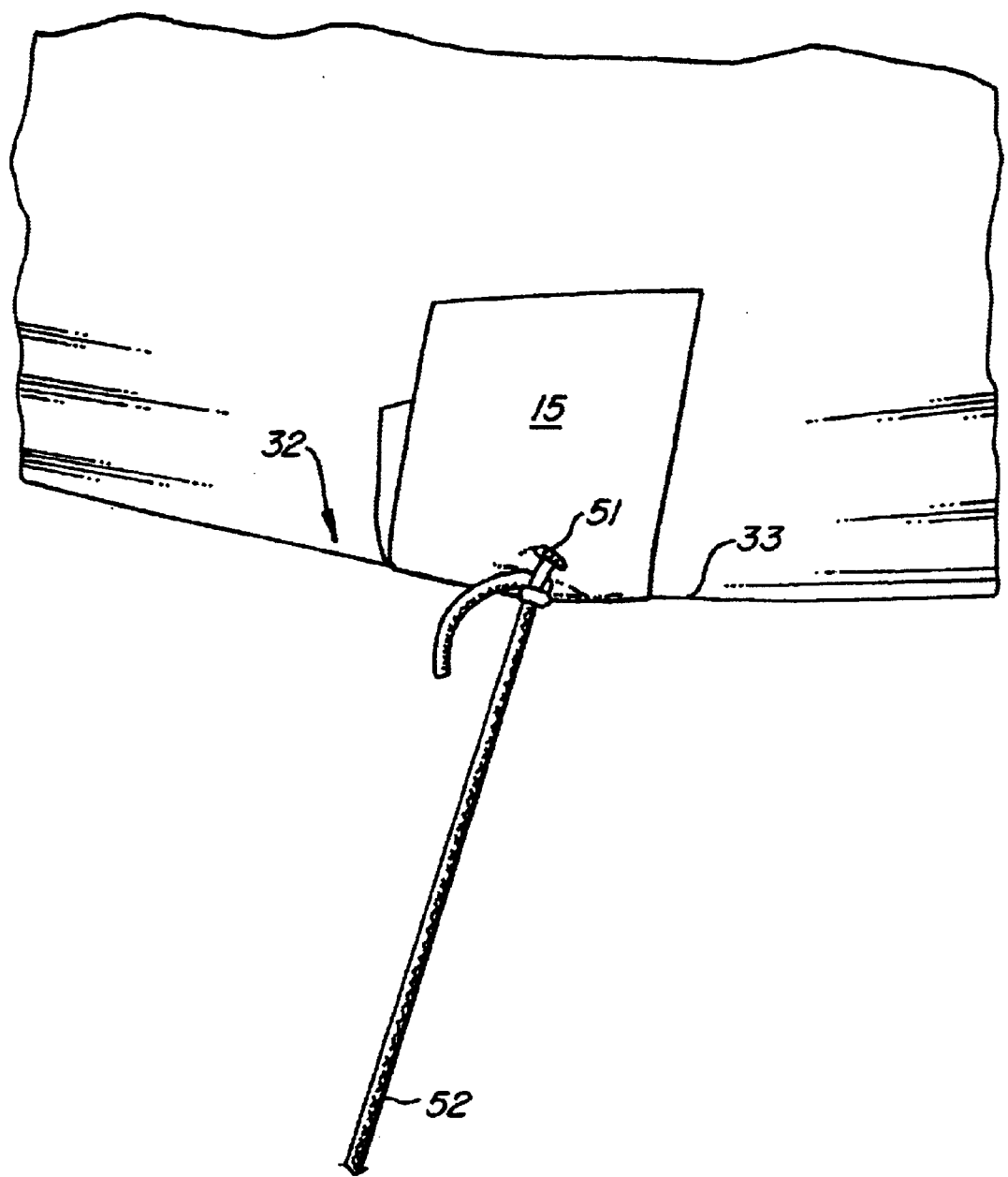
FIG. 4 illustrates the installed tie down with the secured end of the tie down not being shown; and, FIG. 5 shows a covered trellis row of grapevines secured with the tie downs of this invention.

Having set forth label roll 1 and trellised grapevines 2 with their protective canopy 3, the application of the tie down of this invention can be understood by viewing in sequence FIGS. 2, 3, and 4.

Referring to FIG. 2, film canopy side edge 32 has been folded back upon itself at a folded side edge 33. Such folded side edge 33 has a dimension that does not exceed 2 inches.

Next, a tape strip is supplied at the folded back side edge 33. Typically, label face stock 11 having label adhesive 12 is folded over folded side edge 33 and adhered to folded side edge 33. Such fastening begins at the exterior of the film canopy side edge 32 and extends in a U-shaped disposition to the underside of the protective film canopy 3. Label face stock 11 has label adhesive 12 extending over side edge fold 33 and adheres to the underside of protective film canopy 3 at the folded over side edge fold 33. In extending over to the underside of protective film canopy 3, the label face stock 12 prevents unfolding of the folded side edge 33. A firm attachment of the label 15 to film canopy side edge 32 occurs.

Referring to FIG. 3, threading and transpiercing tool 6 is shown producing tie down hole 4 and threading twine 5 through hole 4 simultaneously with the transpiercing. Typically, transpiercing tool 6 comprises grape shears 61 having opposed cutting edges 62 with a pointed end 63. In operation, opposed cutting edges 62 are given sufficient force to grip twine 5 during the transpiercing operation. Once tie down hole 4 is made and twine 5 simultaneously threaded half hitch 51 is placed in twine 5 to secure the twine to the newly installed tie down. (See FIG. 4)

Finally, remote twine end 52 (only partially shown) is tied to either trellis 21 or grapevines 22. Fastening of the protective canopy results.

Returning to FIG. 5, the final result can be seen. Further studying FIG. 5, it will be seen that conventional twine tie downs 7 are utilized. Typically, and at preselected intervals, twine is looped over trellised grapevines and protective film canopy 3 so as to trap the protective film canopy 3 between the twine on top and the grapevines 22 immediately there below. In the prior art, these types of conventional twine tie downs 7 were much more frequently used. Due to the superior holding strength of the tie downs here shown, the frequency of conventional tie downs 7 is much reduced. As of the writing of this application, the frequency of use of conventional tie downs 7 was 20 percent of its former frequency. As conventional tie downs are typically placed after protective film canopy 3 is initially placed, this reduction in conventional tie downs 7 represents a considerable savings.

It will be understood that this invention will admit of modification. For example, we show labels 15 having been serially dispensed from a spirally wound roll 1. It is not required to have such a roll. Further, labels 15 have the advantage of being discrete, premeasured members with which to effect taping of the protective film canopy side edges 32. The use of such premeasured label members 15 is not required.

We have shown here a T-shaped trellis 21. This invention will work on other trellises, including V-shaped trellises. In the latter case, the protective film canopy 3 spans the V-shaped trellis and has a tendency to accumulate water. Relief of such water accumulation can easily be made by punching a small weep hole through protective film canopy 3. Indeed, where the protective film canopy 3 is disposed as illustrated in FIG. 5, puddling again can be relieved by poking holes in the protective film canopy at the location of the puddles. These holes cause local drainage with minimal damage to the underlying grapes.

We prefer to folded canopy side edges 32 at side edge fold 33. Again, this is not required. A tie down according to this invention can be made by placing label 15 on one or the other side of protective film canopy 3. We show hole 4 at the tie down. A through hole is preferred. Such a through hole can be pre-scored in the labels for an easy removal in the field. Alternately, label 15 can be configured to dispose its own tie down point free and clear of protective film canopy 3. For example, label 15 can be supplied with precut holes. Alternately, when the tape is fastened to the canopy, it can be folded to capture the provided twine without the placement of a hole in the label.

Threading and transpiercing tool 6 is preferably a set of grape shears 61. It will be understood the other implements may be used as well. Such implements can include modified screwdrivers, awls, chisels and the like. It is preferred that the tool selected simultaneously transpierce and thread label 15 and protective film canopy 3.

What is claimed is:

1. A process of securing tie downs to the side edges of a film canopy overlying a row of trellised vines comprising the steps of:
   providing a series of tear resistant film labels having adhesive backing temporarily held on a spirally wound release strip;
   separating the labels from the release strip;
   applying the labels to the side edges of the film canopy to adhere to the film canopy;
   providing twine for tying down the side edges of the film canopy;
   after the applying step, transpiercing the labels with at least one unreinforced hole at the side edges of the film canopy;
   threading the transpierced hole with the provided twine;
   tying the threaded twine to the hole at the label; and,
   securing the twine end remote from the side edge of the film canopy to hold down the film canopy.

2. The process of securing tie downs to the side edges of a film canopy overlying a row of trellised vines according to claim 1 comprising the further steps of:
   prior to the applying the labels to the side edges of the film canopy step, folding back side edges of the film canopy to form a double canopy thickness.

3. The process of securing tie downs to the side edges of a film canopy overlying a row of trellised vines according to claim 1 comprising the further steps of:
   prior to the applying the labels to the side edges of the film canopy step, stretching the side edges of the film canopy to form a single canopy thickness.

4. The process of securing tie downs to the side edges of a film canopy overlying a row of trellised vines according to claim 2 wherein the step of applying the label to the side edges of the film canopy includes:
   folding the label over the edge of the folded back edge of the film canopy.

5. The process of securing tie downs to the side edges of a film canopy overlying a row of trellised vines according to claim 4 wherein the step of applying the label to the side edges of the film canopy includes:
   folding the label over the edge of the folded back edge of the film canopy to contact the underside of the film canopy beyond the folded edge.

6. The process of securing tie down to the side edges of a film canopy overlying a row of trellised vines according to claim 1 wherein the transpiercing of the labels and canopy step and the threading of the transpierced hole step includes the steps of:
   providing a transpiercing tool;
   placing twine at an end of the transpiercing tool; and,
   transpiercing of the label with the tool to simultaneously thread the twine.

7. The process of securing tie downs to the side edges of a film canopy overlying a row of trellised vines according to claim 1 wherein the step of transpiercing the labels with at least one hole at the side edges of the film canopy includes:
   transpiercing the canopy.

8. A process of securing tie downs to the side edges of a film canopy overlying a row of trellised vines comprising the steps of:
   providing a tear resistant tape;
   applying the tear resistant tape to the side edges of the film canopy to adhere to the film canopy;
   placing a hole in the tear resistant tape after the applying step;
   providing twine for tying down the side edges of the film canopy;
   threading the tape at the hole with the provided twine;
   tying the threaded twine to the side edge of the film canopy at the tape; and,
   securing the twine remote end from the transpierced hole to hold down the canopy at the tie down.

9. The process of securing tie downs to the side edges of a film canopy overlying a row of trellised vines according to claim 8 wherein the providing a tear resistant tape step includes:
   providing a series of tear resistant film labels having adhesive backing temporarily held on a spirally wound release strip; and,
   separating the labels from the release strip to expose the tape adhesive backing.

10. The process of securing tie downs to the side edges of a film canopy overlying a row of trellised vines according to claim 8 and wherein the step of threading the tape at the hole with the provided twine includes:
    transpiercing the tape to produce at least one hole in the tape; and,
    threading the hole with the provided twine.

11. An improved tie down for a film canopy overlying a row of trellised vines comprising:
    a tear resistant adhesive tape adhered to the side edges of the film canopy;
    an unreinforced hole defined in the tear resistant tape;
    twine threaded at the side edges of the film canopy through the unreinforced hole in the tape,
    the twine remote from the transpierced hole secured to hold down the film canopy at the tie down.

* * * * *